(12) United States Patent
Keilty et al.

(10) Patent No.: US 6,471,487 B2
(45) Date of Patent: Oct. 29, 2002

(54) FLUID DELIVERY SYSTEM

(75) Inventors: Michael J. Keilty, Lyons; Steven M. Jones, Erie, both of CO (US)

(73) Assignee: Micro Motion, Inc., Boulder, CO (US)

( * ) Notice: Subject to any disclaimer, the term of this patent is extended or adjusted under 35 U.S.C. 154(b) by 9 days.

(21) Appl. No.: 09/774,956

(22) Filed: Jan. 31, 2001

(65) Prior Publication Data

US 2002/0100505 A1 Aug. 1, 2002

(51) Int. Cl.$^7$ .................................................. G05D 7/00
(52) U.S. Cl. .......................... 417/26; 417/279; 137/2; 137/487.5; 73/861.04; 73/861.355
(58) Field of Search .................. 73/61.41, 861.04, 73/861.354, 861.355, 861.356; 137/2, 487.5, 563, 565.13, 565.16; 417/1, 23, 26, 28, 279; 222/52, 61

(56) References Cited

U.S. PATENT DOCUMENTS

| | | | | |
|---|---|---|---|---|
| 2,624,198 A | * | 1/1953 | Pearson | 73/861.354 |
| 3,083,570 A | * | 4/1963 | Truman | 417/1 |
| 3,705,626 A | * | 12/1972 | Glenn, Jr. et al. | 166/250.15 |
| 4,872,351 A | * | 10/1989 | Ruesch | 73/861.04 |
| 5,594,180 A | | 1/1997 | Carpenter et al. | |
| 5,687,100 A | * | 11/1997 | Buttler et al. | 702/100 |
| 5,741,977 A | * | 4/1998 | Agar et al. | 73/861.04 |
| 5,804,741 A | * | 9/1998 | Freeman | 702/190 |
| 5,927,321 A | * | 7/1999 | Bergamini | 137/487.5 |
| 6,099,264 A | * | 8/2000 | Du | 417/28 |

* cited by examiner

*Primary Examiner*—John Rivell
*Assistant Examiner*—Ramesh Krishnamurthy
(74) *Attorney, Agent, or Firm*—Faegre & Benson LLP (57) ABSTRACT

The fluid delivery system comprises a Coriolis mass flowmeter, a pump, a recirculation valve, and/or a back-pressure valve. The fluid delivery system prevents the measurement of a multiphase fluid flow without the need for an air eliminator and strainer. The Coriolis mass flowmeter measures the density value of the fluid product being delivered from a fluid source to a destination. The Coriolis mass flowmeter compares the measured density value to at least one of an upper threshold density value and a lower threshold density value. If the measured density value exceeds the at least one of the upper density value or the lower density value, the flowmeter automatically shuts down the pump and closes the back-pressure valve to stop the delivery of the fluid product from the fluid source to the destination to prevent the measurement of a multiphase fluid flow.

18 Claims, 6 Drawing Sheets

FLUID DELIVERY SYSTEM

BACKGROUND OF THE INVENTION

1. Field of the Invention

The present invention pertains to fluid delivery systems, and more particularly, to a simplified fluid delivery system that substantially prevents the measurement of a multiphase fluid flow during the delivery of a fluid product from a source to a destination.

2. Statement of the Problem

Fluid delivery systems are designed to deliver various types of fluid products from a source to a destination. Some examples of these products include petroleum products, such as liquid petroleum gas, gasoline, kerosene, oil and other similar products. Other examples of these products, include agricultural chemicals, corn syrups, milk and corn sugars. The source is often a truck, railroad car, or sea going vessel, with the destination being a storage vessel located at a processing plant or dock. Similarly, the opposite is also true where the source is the storage vessel and the destination is a truck, railroad car, or sea going vessel.

Fluid delivery systems typically include, a pump connected to the source, which provides the required pressure to move the fluid through the system from the source to the destination. A strainer connected to the pump is used in some, but not all applications, to provide filtration from the intrusion of grit and other foreign matter that can damage downstream components such as the meter. The meter is typically a positive displacement or turbine volumetric measuring device that measures a volume of the fluid as the fluid is delivered from the source to the destination.

It is a problem in fluid delivery systems to prevent the measurement of entrained air or vapor in the fluid during delivery. For example, as the source of the fluid is emptied, pressure from the pump can break the surface tension of the remaining fluid in the source causing a multiphase flow of air and fluid to be pumped through the delivery system. When this occurs, the volumetric meter cannot differentiate between a pure fluid flow and the multiphase fluid flow comprising both the air and fluid.

One solution to this problem is to use an air eliminator to separate and remove undesired air or vapor from the fluid prior to delivery to the meter. An air eliminator removes entrained air by decreasing the velocity of the fluid to a relatively calm state by permitting the fluid to accumulate in a chamber in the air eliminator. The substantial decrease in velocity causes trapped air bubbles or vapor to rise out of the fluid and collect in the upper portion of the chamber where it is vented. The air eliminator also prevents damage to the meter by preventing large amounts of air from passing through the meter. Large amounts of air passing through the meter can cause over-speeding of the measuring unit or excessive wear that eventually results in meter failure.

Unfortunately, several problems exist in present delivery systems due to the necessity of an air eliminator. A first problem with the air eliminator is the overall size required for some applications. For example, the rate of separation for high viscosity products, such as oil based petroleum products, results in the need for a large air eliminator. Similarly, high viscosity products require a longer retention time for separation that results in slower fluid delivery and a less efficient delivery system.

A second problem with air eliminators is that products such as fuel oil, diesel oil, and kerosene, often foam up as they pass through the delivery system causing air to discharge in the form of vapor. The vapor from these products is hazardous and cannot be discharged directly into the atmosphere, thus requiring a separate storage tank to accommodate vented vapors.

A third but related problem with air eliminators is the cost added to the delivery system by the inclusion of the air eliminator and in some cases a storage tank for vented vapor. For example, in delivery systems designed for heavy oils, the required tank size is so large that it is often more economical to prevent the entrance of entrained air rather than remove it during delivery. In this case, however, various additional and expensive precautions must be taken that significantly add to the transportation and storage cost for these products.

It is known in the art to use mass flowmeters to measure mass flow and other information for materials flowing through a conduit. Some types of mass flowmeters, especially Coriolis flowmeters, are capable of being operated in a manner that performs a direct measurement of density to provide volumetric information through the quotient of mass over density. See, e.g., U.S. Pat. No. 4,872,351 to Ruesch assigned to Micro Motion for a net oil computer that uses a Coriolis flowmeter to measure the density of an unknown multiphase fluid. U.S. Pat. No. 5,687,100 to Buttler et al. teaches a Coriolis effect densitometer that corrects the density readings for mass flow rate effects in a mass flowmeter operating as a vibrating tube densitometer.

Coriolis flowmeters directly measure the rate of mass flow through a conduit.

As disclosed in U.S. Pat. Nos. 4,491,025 (issued to J. E. Smith et al. on Jan. 1, 1985, hereinafter referred to as the U.S. Pat. No. 4,491,025) and U.S. Pat. No. Re. 31,450 (issued to J. E. Smith on Feb. 11, 1982, hereinafter referred to as U.S. Pat. No. Re. 31,450, these flowmeters have one or more flowtubes of straight or curved configuration. Each flowtube configuration in a Coriolis mass flowmeter includes a set of natural vibration modes, which could be of a simple bending, torsional or coupled type. Fluid flows into the flowmeter from the adjacent pipeline on the inlet side, is directed through the flowtube or tubes, and exits the flowmeter through the outlet side of the flowmeter. The natural vibration modes of the vibrating fluid filled system are defined in part by the combined mass of the flowtubes and the fluid within the flowtubes. Each flow conduit is driven to oscillate at resonance in one of these natural modes.

When there is no flow through the flowmeter, all points along the flowtube oscillate with identical phase. As fluid begins to flow, Coriolis accelerations cause each point along the flowtube to have a different phase. The phase on the inlet side of the flowtube lags the driver, while the phase on the outlet side leads the driver. Sensors can be placed on the flowtube to produce sinusoidal signals representative of the motion of the flowtube. The phase difference between two sensor signals is proportional to the mass flow rate of fluid through the flowtube. A complicating factor in this measurement is that the density of typical process fluids varies. Changes in density cause the frequencies of the natural modes to vary. Since the flowmeter's control system maintains resonance, the oscillation frequency varies in response. Mass flow rate in this situation is proportional to the ratio of phase difference and oscillation frequency.

The Coriolis flowmeter is intended for use in environments where multiphase flow exists. Multiphase flow is defined as flow including at least two states of matter: solid, liquid or gas. The flowmeter is especially useful in multiphase systems including gas and liquid or gas and solids. These environments are especially common in the petroleum industry where a petroleum product is delivered from a source to a destination. Unfortunately, Coriolis flowmeters have not been used in petroleum delivery systems, in part, because they measure mass, as opposed to volume, and the sales of petroleum take place in volume. Furthermore, while these meters can functionally detect multiphase flow they cannot remove a gas or solid from the flow, and therefore, an air eliminator would still be required.

SOLUTION

The present invention overcomes the problems outlined above and advances the art by providing a fluid delivery system that includes a Coriolis mass flowmeter to eliminate the need for an air eliminator and/or a strainer. In a first embodiment of the present invention, the fluid delivery system comprises a Coriolis mass flowmeter, a pump, and a recirculation valve. The pump is connected to the fluid source and the input end of the Coriolis mass flowmeter. The recirculation valve is connected to the output end of the Coriolis mass flowmeter, the fluid source, and the destination for the fluid. The recirculation valve operates under the control of the meter to prevent the measurement of a multiphase fluid flow during priming of the system. During system priming the meter electronics control the recirculation valve to direct multiphase fluid flow containing entrained air back to the fluid source until a substantially pure fluid flow is established. Once a substantially pure fluid flow is established, the meter electronics again control the recirculation valve to direct the fluid flow to the destination and begin measurement of the delivered fluid. The pump also operates under the control of the meter to start and stop the delivery of the fluid through the fluid delivery system. In some examples of the present fluid delivery system, a back-pressure valve could also be included to prevent the back-flow of fluid through the delivery system when the system is shut down. In the context of this application, system priming is defined as the establishment of a substantially pure fluid flow following the introduction of a multiphase fluid flow. System priming is required any time air is introduced into the system, which typically occurs when the system does not remain full, such as during system shut down or where the source is emptied. One skilled in the art will appreciate that this embodiment is ideal for fluids such as milk, kerosene and gasoline that have a tendency to foam during delivery or until the system is primed. In these environments, the flowmeter prevents measurement and delivery to the destination until a substantially pure flow is established.

In a second embodiment of the present invention, the delivery system comprises a Coriolis mass flowmeter, a pump, and a back-pressure valve. The pump is connected to the fluid source and the input end of the Coriolis mass flowmeter. The back-pressure valve is connected to the output end of the meter and the destination for the fluid. The pump operates under the control of the meter to stop the delivery of the fluid in response to the detection of a multiphase fluid flow through the meter. The back-pressure valve also operates under the control of the meter to prevent back-flow of fluid through the delivery system when the system is shut down. This embodiment is ideal for liquefied compressed gases that change from a liquid to a gas as the source is emptied and the pressure approaches atmospheric pressure. In response to detecting the presence of a multiphase flow, the Coriolis mass flowmeter shuts down the pump and closes the back-pressure valve to prevent the measurement of the multiphase flow. When the source is again filled, bringing the pressure back to the pressure required for the liquid state of the liquefied compressed gas, any material in the gas state returns to the liquid state. Thus, the pump can again be started and the back-pressure valve opened for further delivery of the liquefied compressed gas.

The Coriolis mass flowmeter is capable of use as a vibrating densitometer in multiphase flow environments including combinations of gas and liquids, gas and solids, or solids and liquids. The flowmeter includes at least one flowtube and a driver for vibrating the flowtube at a fundamental frequency corresponding to a density of material flowing through the flowtube. The meter electronics monitor the vibrating flowtube(s) for changes in the density value of the fluid product to determine the existence of a multiphase flow through the meter. During meter operation, the density value is compared against a threshold value where multiphase flow including gas and liquid is indicated by the measured density value exceeding a threshold value. A second comparison could be made against a second threshold value to indicate the existence of multiphase flow including gas and solids, liquid and solids, or liquid, gas and solids, which could exhibit similar damping effects to those of gas and liquid systems. The meter electronics respond to the existence of multiphase flow in the flowtube(s) and provide output signals to the pump, the recirculation valve, and back-pressure valve to either stop delivery of the fluid or redirect the fluid delivery back to the source to prevent measurement and delivery of a multiphase flow.

A first advantage of the present delivery system is that an air eliminator is not required. The present delivery system is configured to either stop the flow of fluid product through the system or redirect the flow back to the fluid source in response to the detection of a multiphase product flow. Thus, in the first embodiment above, the fluid product is redirected back to the source to establish a substantially pure fluid flow before delivery to the destination and measurement. In the second embodiment above, the fluid delivery system stops delivery of the fluid altogether in response to detection of a multiphase fluid flow. A second advantage of the present delivery system is that the Coriolis mass flowmeter is intended for use in any environment where multiphase flow exists. Thus, the present delivery system does not require a strainer to prevent the intrusion of grit and other foreign matter that can damage downstream components. Upon detection of foreign matter, the meter controls the recirculation valve and back-pressure valve where included, to either stop delivery of the fluid product or redirect delivery back to the fluid source.

Therefore, an aspect of the present invention comprises:

a fluid delivery system for measuring a substantially pure fluid product flow and preventing measurement of a multiphase fluid flow during delivery of a fluid product from a fluid source to a destination;

a pump connected between the fluid source and the destination for delivering the fluid product from the fluid source to the destination;

a Coriolis mass flowmeter connected between the pump and the destination and configured to detect a beginning of the multiphase fluid flow as the fluid product is delivered from the fluid source to the destination;

a back-pressure valve connected between the Coriolis mass flowmeter and the destination and configured to open or close under the control of the Coriolis mass flow meter;

means within the Coriolis mass flowmeter for controlling the pump in response to detecting the beginning of the multiphase fluid flow to cause the pump to stop delivery of the fluid product from the fluid source to the destination; and means within the Coriolis mass flowmeter for controlling the back-pressure valve in response to detecting the beginning of the multiphase fluid flow to cause the back-pressure valve to close, wherein the Coriolis mass flowmeter uses the pump controlling means and the back-pressure valve controlling means to prevent the measurement of the multiphase fluid flow by stopping delivery of the fluid product in response to detecting the beginning of the multiphase fluid flow.

Another aspect is:

a recirculation valve that is connected to the Coriolis mass flowmeter, the fluid source, and the destination, and is configured to direct the fluid product in a first direction that terminates at the fluid source and a second direction that terminates at the destination.

Another aspect is:

a means within the Coriolis mass flowmeter for controlling the recirculation valve in response to detecting the beginning of the multiphase fluid flow to cause the recirculation valve to direct the fluid product in the first direction, wherein the Coriolis mass flowmeter uses the pump controlling means and the recirculation valve controlling means to prevent the measurement of the multiphase fluid flow by causing the recirculation valve to direct the fluid product in the first direction back to the fluid source.

Another aspect is:

a fluid delivery system wherein the back-pressure valve is configured to provide back pressure in the fluid delivery system.

Another aspect is:

meter electronics electrically connected to the recirculation valve and configured to provide a first output signal to the recirculation valve in response to detecting the beginning of the multiphase fluid flow that causes the recirculation valve to direct the fluid product in the first direction back to the fluid source.

Another aspect is:

meter electronics that are electrically connected to the pump and configured to provide a second output signal to the pump in response to detecting the beginning of the multiphase fluid flow that causes the pump to stop delivery of the fluid product from the fluid source to the destination.

Another aspect is:

meter electronics that are electrically connected to the back-pressure valve and configured to provide a third output signal to the back pressure valve in response to detecting the beginning of the multiphase fluid flow that causes the back pressure valve to provide the back-pressure in the fluid delivery system.

Another aspect is:

meter electronics that are configured to measure a density value of the fluid product and if the density value is greater than an upper threshold density value, provide at least one of the first, the second, and the third output signals.

Another aspect is:

meter electronics that are configured to measure the density value of the fluid and if the density value is lower than a lower threshold density value provide at least one of the first, the second, and the third output signals.

Another aspect is:

meter electronics that are configured to measure the density value of the fluid product and if the density value is equal to the upper threshold density value provide the at least one of the first, the second, and the third output signals.

Another aspect is:

meter electronics that are configured to measure the density value of the fluid product and if the density value is equal to the lower threshold density value provide the at least one of the first, the second, and the third output signals.

Another aspect is:

A method for measuring a fluid product flow during delivery of a fluid product from a fluid source to a destination comprising the steps of:

delivering a fluid product from the fluid source to the destination;

detecting a beginning of a multiphase fluid flow as the fluid product is delivered from the fluid source to the destination;

providing a first output signal to a pump to stop delivery of the fluid product in response to detecting the beginning of the multiphase fluid flow; and providing a second output signal to a back-pressure valve to provide back-pressure in response to detecting the beginning of the multiphase fluid flow.

Another aspect is:

measuring a density value of the fluid product as the fluid product is delivered from the fluid source to the destination; and comparing the measured density value to an upper threshold density value, wherein the multiphase fluid flow is indicated by the measured density value being greater than the upper threshold density value.

Another aspect is a fluid delivery system for measuring a substantially pure fluid product flow and preventing measurement of a multiphase fluid flow during delivery of a fluid product from a fluid source to a destination, the fluid delivery system comprising:

a pump connected between the fluid source and the destination for delivering the fluid product from the fluid source to the destination;

a Coriolis mass flowmeter connected between the pump and the destination and configured to detect a beginning of the multiphase fluid flow as the fluid product is delivered from the fluid source to the destination;

a recirculation valve that is connected to the Coriolis mass flowmeter, to the fluid source, and to the destination, and is configured to direct the fluid product in a first direction that terminates at the fluid source and a second direction that terminates at the destination; and means within the Coriolis mass flowmeter for controlling the pump in response to detecting the beginning of the multiphase fluid flow to cause the pump to stop delivery of the fluid product from the source to the destination.

Preferably a back-pressure valve is connected between the Coriolis mass flowmeter and the destination and configured to open or close under the control of the Coriolis mass flow meter; and means within the Coriolis mass flowmeter for closing the back-pressure valve in response to detecting the beginning of the multiphase fluid flow; to cause the back-pressure valve to close;

said Coriolis mass flowmeter prevents the measurement of a multiphase fluid flow by operating the pump controlling means and the back-pressure valve controlling means to stop the delivery of the fluid product in response to the detecting of the beginning of the multiphase fluid flow.

Another aspect is:

measuring the density value of the fluid product as the fluid product is delivered from the fluid source to the destination; and comparing the measured density value to an upper threshold density value, wherein the multiphase fluid flow is indicated by the measured density value being equal to the upper threshold density value.

Another aspect is:

measuring the density value of the fluid product as the fluid product is delivered from the fluid source to the destination; and comparing the measured density value to a lower threshold density value, wherein the multiphase fluid flow is indicated by the measured density value being lower than the lower threshold density value.

Another aspect is:

measuring the density value of the fluid product as the fluid product is delivered from the fluid source to the destination; and comparing the measured density value to the lower threshold density value, wherein the multiphase fluid flow is indicated by the measured density value being equal to the lower threshold density value.

DETAILED DESCRIPTION OF THE INVENTION

The present invention will now be described more fully hereinafter with reference to the accompanying drawings, in which embodiments of the invention are shown. Those skilled in the art will appreciate that the invention could be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Additionally, those skilled in the art will appreciate that various features described below could be combined to form multiple variations of the invention.

Figure 1:
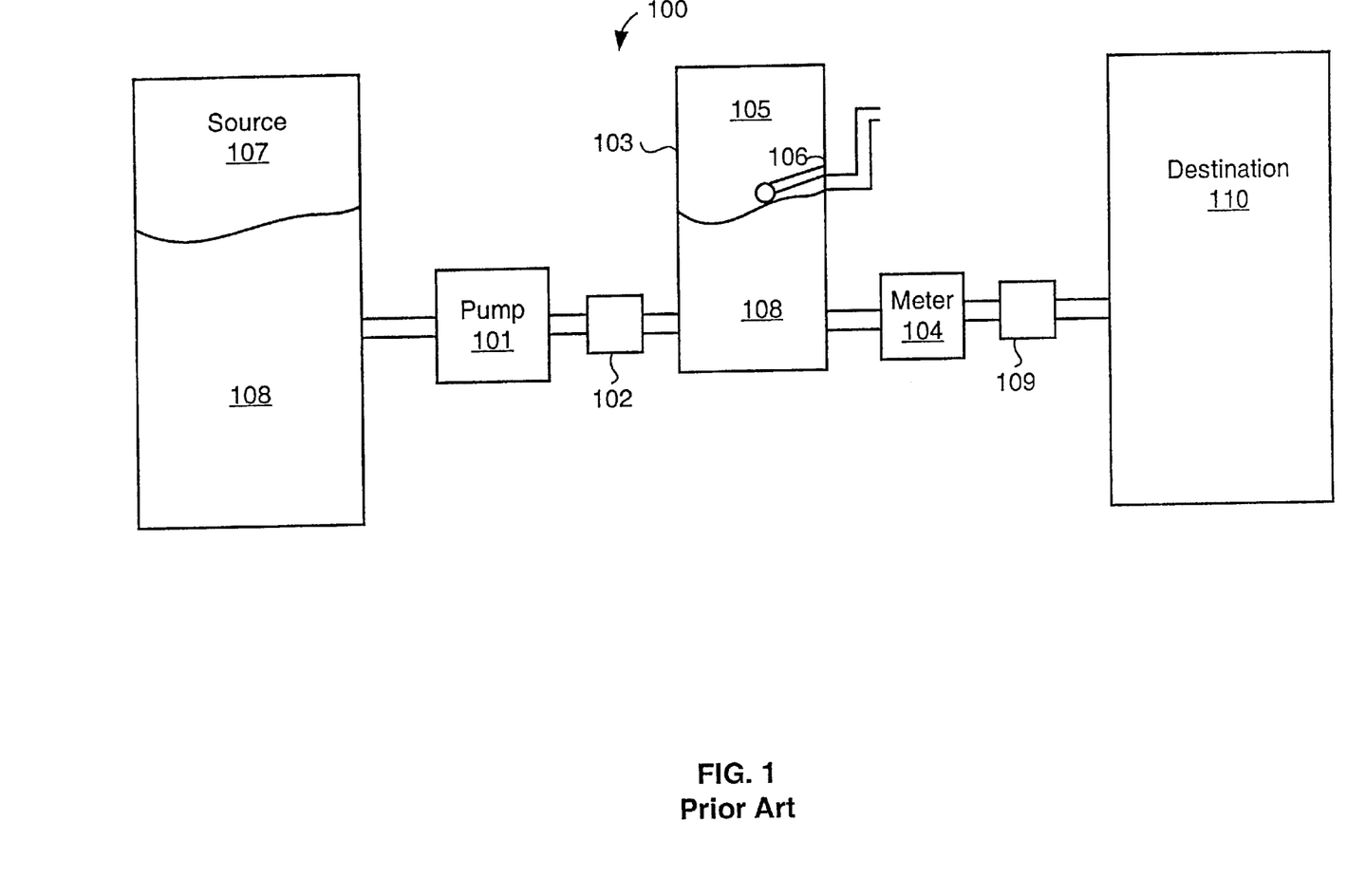
FIG. 1 depicts a prior art fluid delivery system.

Prior Art Delivery Systems—FIG. 1:

FIG. 1 illustrates an example of a typical prior art fluid delivery system 100. In the fluid delivery system 100, a pump 101 connected to a source 107 provides the required pressure to move the fluid product 108 through the delivery system 100 from the fluid source 107 to a destination 110. A strainer 102 connected to the pump 101 provides filtration from the intrusion of grit and other foreign matter that can damage downstream components such as meter 104. The meter 104 is typically a positive displacement or turbine volumetric measuring device that measures a volume of the fluid product passing through the delivery system 100 from the source 107 to the destination 110.

An air eliminator 103 removes entrained air by decreasing the velocity of the fluid product 108 to a relatively calm state by permitting the fluid product 108 to accumulate in a chamber 105 in the air eliminator 103. The substantial decrease in velocity causes trapped air bubbles or vapor to rise out of the fluid product 108 and collect in the upper portion of the chamber 105. As the air vapor displaces the fluid volume, a float operated valve 106 opens to vent the air vapor from the chamber 105. Depending on the type of the fluid product 108 being delivered, the air vapor is either vented to the atmosphere or to a separate containment vessel (not shown). As the air is discharged from the chamber 105, the pressure is released allowing the fluid level to rise and shut the float-operated valve 106.

Figure 2:
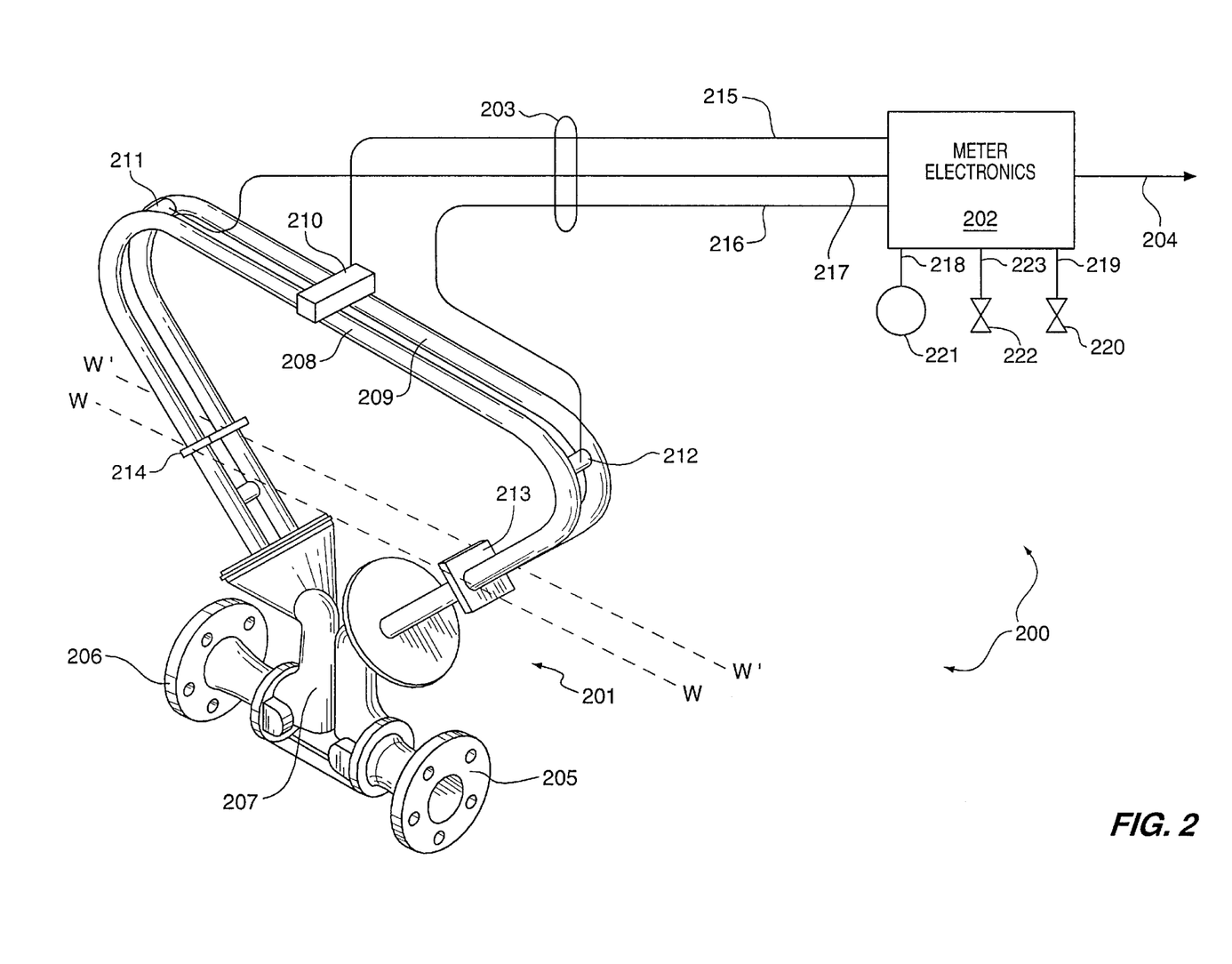
FIG. 2 depicts a Coriolis mass flowmeter according to the present invention.

Coriolis Flowmeter According to the Present Invention—FIG. 2

FIG. 2 illustrates a Coriolis mass flowmeter 200 comprising a pump 221, a first valve 220 and a second valve 222. The Coriolis mass flowmeter 200 comprises a flowmeter assembly 201 and the meter electronics 202. The meter electronics 202 are connected to the meter assembly 201 via the paths 203 to provide density, mass flow rate, volume flow rate, totalized mass flow and other information over a path 204. The meter electronics 202 are also connected to the pump 221 via path 218 to provide output signals that control the pump 221 causing the pump 221 to turn on and off. Finally, the meter electronics 202 are connected to the valve 220 via path 219 and to the valve 222 via path 223 to provide output signals that control the valve 220 and the valve 222. Flowmeter assembly 201 includes a pair of flanges 205 and 206, a manifold 207 and flowtubes 208 and 209. A driver 210 and pick-off sensors 211 and 212 are connected to the flowtubes 208 and 209. The brace bars 213 and 214 serve to define the axes W and W' about which each of the flowtubes 208 and 209 oscillate.

When the flowmeter assembly 201 is inserted into a pipeline system (not shown), which carries the fluid product being measured, the fluid product enters the flowmeter assembly 201 through the flange 206 and passes through the manifold 207. The fluid product is directed to enter the flowtubes 208 and 209 and flows through the flowtubes 208 and 209 and back into the manifold 207 where it exits the flowmeter assembly 201 through the flange 205.

The flowtubes 208 and 209 are selected and appropriately mounted to the manifold 207 so as to have substantially the same mass distribution, moments of inertia, and elastic modules about bending axes W—W and W'—W' respectively. The flowtubes 208 and 209 extend outwardly from the manifold 207 in an essentially parallel fashion. The flowtubes 208 and 209 are driven by the driver 210 in opposite directions about their respective bending axes W and W' and at what is termed the first out of bending fold of the flowmeter assembly 201. The driver 210 is one of many well known arrangements. One example of the driver 210 is a magnet mounted to the flowtube 208 and an opposing coil mounted to the flowtube 209. An alternating current passed through the opposing coil causes both flowtubes 208 and 209 to oscillate. A suitable drive signal is applied to the driver 210 by the meter electronics 202, via path 215.

The Coriolis mass flowmeter 200 is configured to distinguish a substantially pure product flow from a multiphase fluid flow by comparing variations in the vibrational frequency of the flowtubes 208 and 209 with the changing density that occurs when a substantially pure product flow turns into a multiphase product flow. When there is no flow through the flowmeter 200, all points along the flowtubes 208 and 209 oscillate with identical phase. As fluid begins to flow, Coriolis accelerations cause each point along the flowtubes 208 and 209 to have a different phase. The phase on the inlet side of the flowtubes 208 and 209 lags the driver 210, while the phase on the outlet side of the flowtubes 208 and 209 leads the driver 210. The pick-off sensors 211 and 212 produce sinusoidal signals representative of the motion of the flowtubes 208 and 209. The phase difference between the sensor signals is proportional to the mass flow rate of fluid through the flowtubes 208 and 209. Changes in the density of the fluid flow cause the frequencies of the natural modes to vary.

Operationally, the driver 110 vibrates the flowtubes 208 and 209 at a fundamental frequency corresponding to a density of the fluid product flowing through the flowtubes 208 and 209. The meter electronics 202 monitor the drive gain in the vibrating flowtubes 208 and 209 for a change in value to determine a change in density indicating the existence of a multiphase flow through the flowtubes 208 and 209. The change in density is compared against an upper threshold value where multiphase flow including gas and liquid is indicated by the changed density value exceeding the upper threshold value. A second comparison is made against a lower threshold value to indicate the existence of multiphase flow including gas and solids, liquid and solids, or liquid, gas and solids, which exhibit similar damping effects to those of gas and liquid systems. Thus, the meter electronics 202 could use one or both of the upper threshold value or the lower threshold value to determine the beginning of a multiphase product flow. These density thresholds are predetermined by the user or manufacturer of the Coriolis mass flowmeter 200 and are programmed into the meter electronics 202. The meter electronics 202 respond to the beginning of the multiphase flow to provide output signals to the pump 221, and the valves 220 and 222 to either stop delivery of the fluid product or redirect the delivery back to the fluid source.

The meter electronics 202 receive the right and left velocity signals appearing on paths 216 and 217, respectively. The meter electronics 202 produce the drive signal on path 215 causing driver 210 to oscillate flowtubes 208 and 209. The meter electronics 202 process left and right velocity signals to compute the mass flow rate. The path 204 provides an input and an output means that allows the meter electronics 202 to interface with an operator. In addition, the meter electronics 202 generate output signals over path 218 to pump 221, over path 223 to valve 222, and over path 219 to valve 220. The output signals are generated in response to the detection of a multiphase flow by the meter electronics 202. The output signals cause the pump 221, the valve 222, and the valve 220 to either stop the fluid product flow to prevent the measurement of a multiphase product flow or redirect the product flow to prevent delivery to the destination and measurement. As will become apparent from the following description, during priming, the meter electronics 202 could cause the valve 222 to redirect product flow back to the fluid source to establish a substantially pure product flow before delivery to a destination and measurement. In another example, the meter electronics 202 could cause the pump 221 to shut off and the valve 220 to close to substantially prevent all delivery and measurement of a multiphase product flow.

The description of FIG. 2 is provided merely as an example of the operation of a Coriolis mass flowmeter and is not intended to limit the teaching of the present invention. The present invention is equally applicable to other types of mass flowmeters including single tube meters. Additionally, the present invention is equally applicable to fluid delivery systems having multiple pumps and/or multiple valves.

Figure 3:
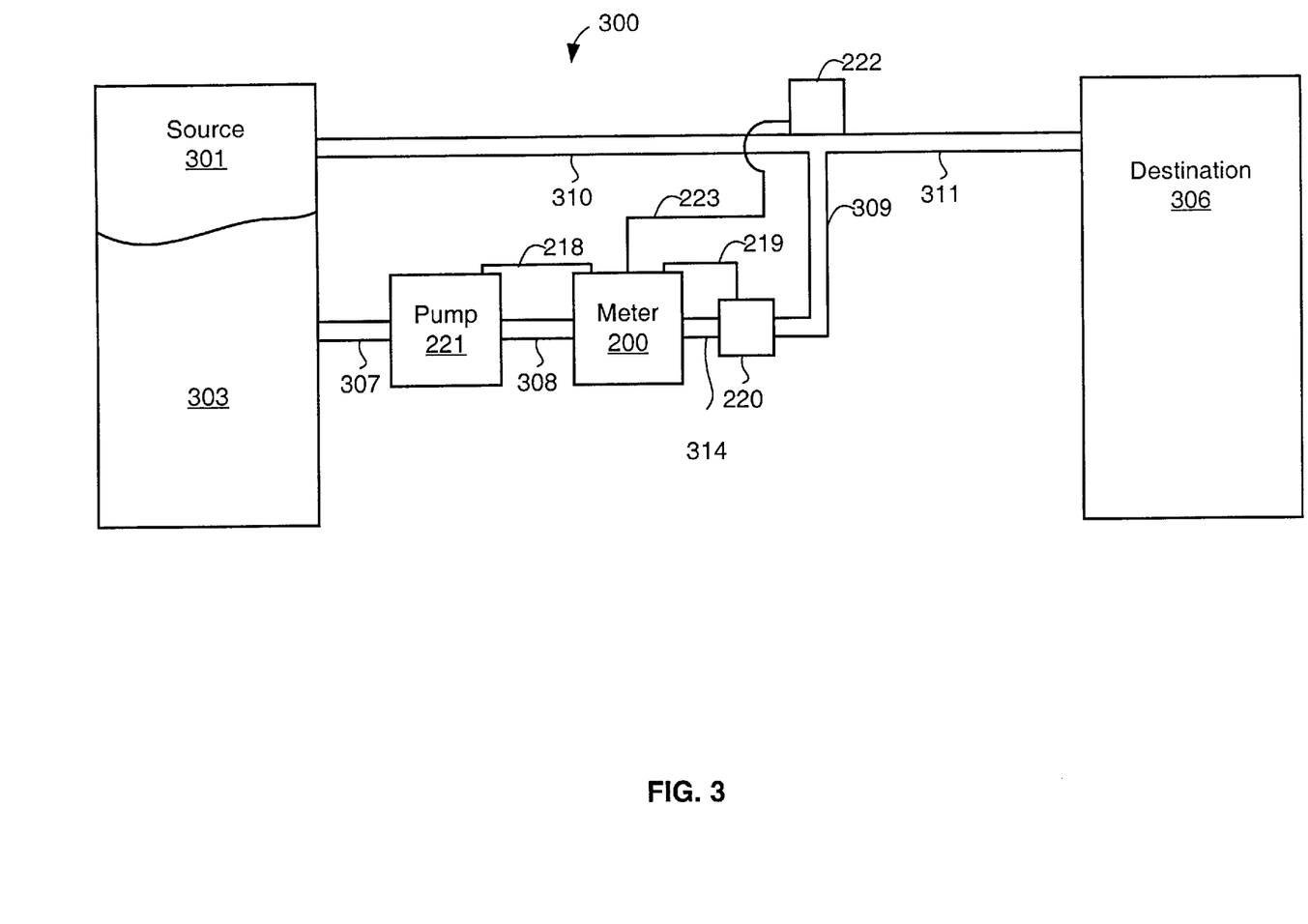
FIG. 3 depicts a first embodiment of a fluid delivery system according to the present invention.

Fluid Delivery System—FIG. 3

FIG. 3 illustrates an example of a fluid product delivery system according to the present invention, namely fluid delivery system 300. The fluid delivery system 300 comprises a fluid source 301 of a fluid product 303, a pump 221, a Coriolis mass flowmeter 200, a recirculation valve 222, a back-pressure valve 220, and a destination 306 for the fluid product 303. Those skilled in the art will appreciate that the fluid delivery system 300 could be a stand-alone system or could be mounted to a mobile unit such as a vehicle.

The fluid source 301 could be any source configured to contain the fluid product 303. For example, the fluid source 301 could be configured to contain a liquid petroleum gas, crude oil, kerosene, milk, gasoline corn syrups, corn sugars, agricultural chemicals, as well as other liquid products. Similarly, the fluid source 301 could be a storage tank for off-loading the fluid product 303 to a tank-truck, a railroad car, or a sea going vessel. In other examples, the fluid source 301 could be the tank-truck, the railroad car, or the sea going vessel that is off-loading the fluid product 303 to a storage tank. Likewise, the destination 306 could be any destination configured to receive the fluid product 303. For example, the destination 306 could be the tank-truck, the railroad car, the sea going vessel, or the storage tank. Some examples of the fluid product 303 include without limitation, gasoline, kerosene, light fuel oil, diesel products, liquid petroleum gas, crude oil, diesel oil, fuel oil, milk, corn syrups, corn sugars, agricultural chemicals, or numerous other fluid products.

The pump 221 is a conventional pump configured to receive output signals from the flowmeter 200 and in response to the output signals cause the pump 221 to turn on and shut off. In some examples of the present invention, the flowmeter 200 could also control the speed at which the pump 221 delivers the fluid product through the fluid delivery system 300. The pump 221 could be centrifugal or engine driven as a matter of design choice. The pump 221 should be of an appropriate size to provide a maximum rate of flow that is within the rated capacity of the flowmeter 200. Those skilled in the art will appreciate that the pump 221 and the flowmeter 200 could be a variety of capacity ratings according to the specific fluid product 303 accommodated. The recirculation valve 222 is a conventional recirculation valve that is configured to receive output signals from the flowmeter 200 and in response to the output signals from the flowmeter 200 direct the flow of the fluid product 303 to the fluid source 301 or the destination 306. The back-pressure valve 220 is a conventional back-pressure valve configured to receive output signals from the flowmeter 200 and open or close in response to the output signals to prevent the back-flow of the fluid product 303 in the fluid delivery system 300.

The fluid source 301, the pump 221, the flowmeter 200, the recirculation valve 222, the back-pressure valve 220, and the destination 306 are connected as illustrated by FIG. 3 by conventional piping. Those skilled in the art will appreciate that the piping is selected according to the fluid product 303 being accommodated, and thus, various different types of piping could be used as a matter of design choice. Specifically, the input of the pump 221 is connected to the fluid source 301 by piping 307 and the output of the pump 221 is connected to the input of the flowmeter 200 by piping 308. The output of the flowmeter 200 is connected to the back-pressure valve 220 by piping 314. The back-pressure valve 220 is connected to the input of the recirculation valve 222 by piping 309. The recirculation valve 222 provides a three-way tee connection between the piping 309 and the piping 310 and the piping 311. The piping 310 terminates at the fluid source 301 and the piping 311 terminates at the destination 306. Advantageously, the recirculation valve 222 prevents the simultaneous delivery of the fluid product 303 to the destination 306 and the fluid source 301.

The Coriolis mass flowmeter 200 is electrically connected to the pump 221 by the path 218 to provide the output signals that control the pump 221. The Coriolis mass flowmeter 200 is also electrically connected to the back-pressure valve 220 by the path 219 to provide the output signals that control the back-pressure valve 220. Finally, the Coriolis mass flowmeter 200 is electrically connected to the recirculation valve 222 by the path 223 to provide the output signals that control the recirculation valve 222.

One skilled in the art will appreciate that, the fluid delivery system 300 is ideal for fluid products that have a tendency to foam during delivery or until the system 300 is primed. In these environments, the flowmeter 200 prevents delivery to the destination 306 and measurement until the substantially pure flow is established. Some examples of fluid products that have a tendency to foam during delivery include milk, kerosene and gasoline. However, those skilled in the art will equally appreciate that the fluid delivery system 300 would also be applicable to any type of fluid delivery between a source and destination.

Figure 4:
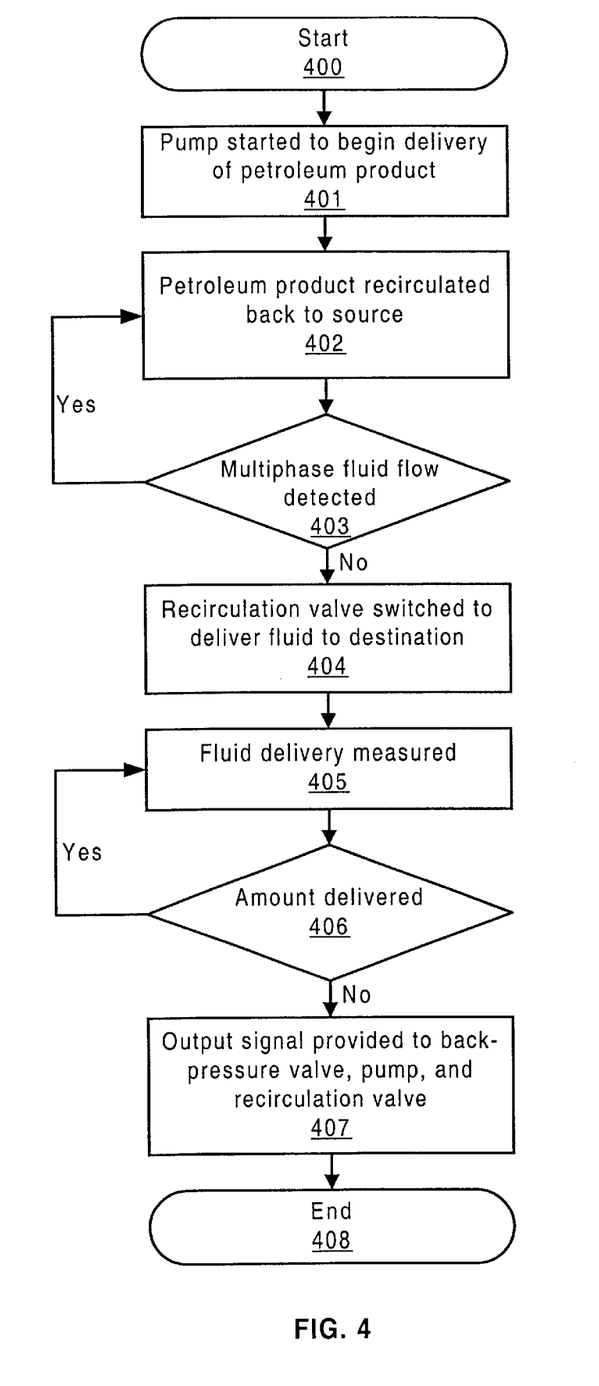
FIG. 4 depicts a flow chart illustrating an example of the operation of the embodiment of FIG. 3 according to the present invention.

Operation of the Fluid Delivery System FIG. 4:

FIG. 4 is a flow chart illustrating the operation of the fluid delivery system 300 according to the present invention. On FIG. 4 the operation begins at step 400. At step 401, the pump 221 is started to begin delivery of the fluid product 303 through the fluid delivery system 300. At step 402, the recirculation valve 222 is in position to deliver the fluid product 303 through the piping 310 back to the fluid source 301. Advantageously, this permits recirculation of the fluid product back to the fluid source 301 during system priming or startup to flush air left over from prior uses out of the fluid system delivery 300 to establish a substantially pure flow of the fluid product 303. At step 403, the flowmeter 200 monitors the density value of the fluid product 303 to determine the flow type, e.g. a multiphase product flow or substantially pure flow of fluid product 303. If at step 403, a substantially pure flow is detected, the flowmeter 200 provides an output signal to the recirculation valve 222 that causes the recirculation valve 222 to switch positions and deliver the fluid product 303 to the destination 306, at step 404. Substantially simultaneously at step 405, the flowmeter 200 begins measurement of the fluid product 303 delivered to the destination 306. If at step 403, a multiphase flow of fluid product 303 is detected, step 402 is repeated.

If at step 406, the desired amount of fluid product 303 is delivered to the destination 306, the flowmeter 200 provides an output signal to the back-pressure valve 220, the pump 221 and the recirculation valve 222. The output signal to the pump 221 causes the pump 221 to shut down and stop the delivery of the fluid product 303 through the fluid delivery system 300. The output signal to the back-pressure valve 220, causes the back-pressure valve 220 to close to prevent back-flow of the fluid product 303 in the fluid delivery system 300. The output signal to the recirculation valve 222 causes the recirculation valve 222 to switch positions so that the fluid product 303 will again be delivered back to the fluid source 301 during system startup. The process ends at step 408.

Figure 5:
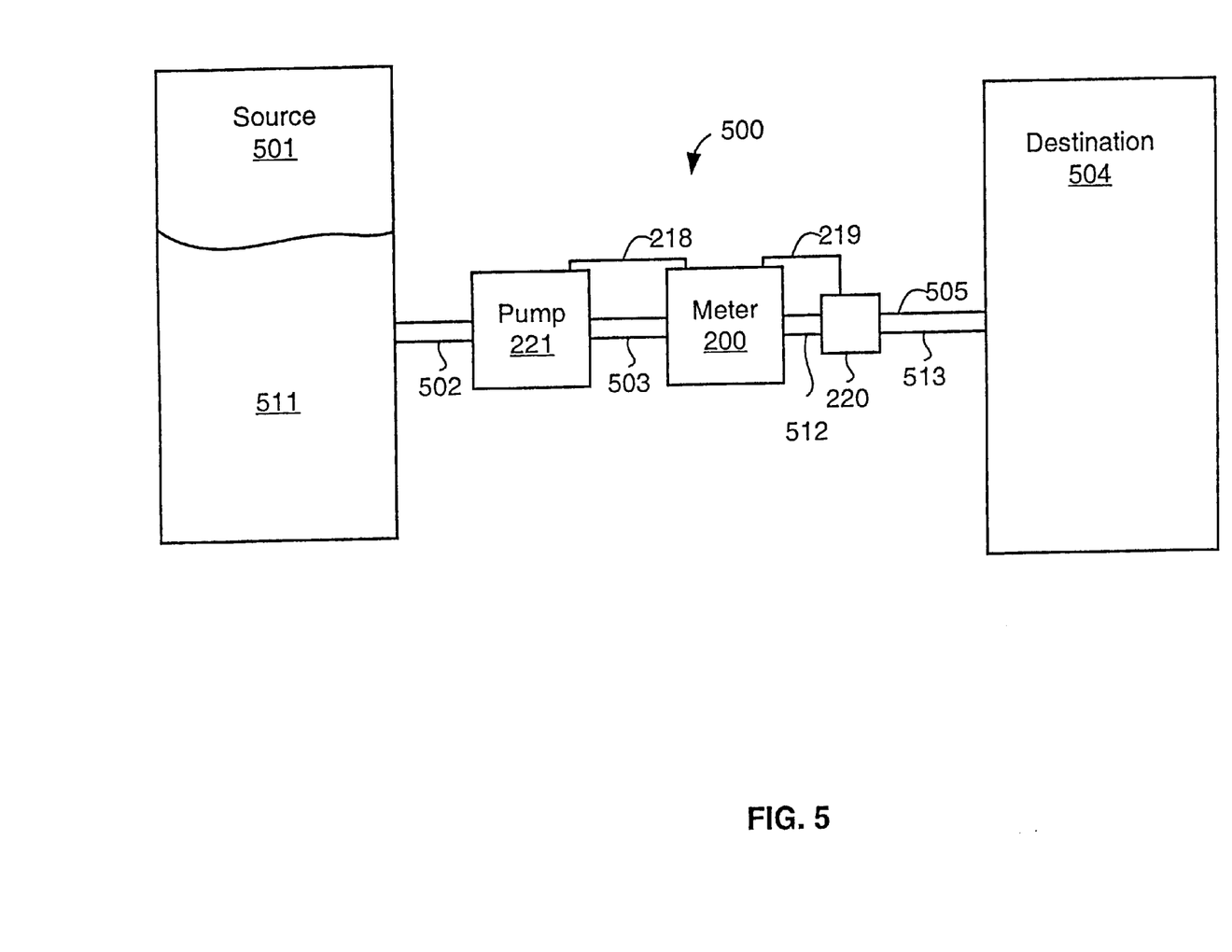
FIG. 5 depicts a second embodiment of a fluid delivery system according to the present invention.

Liquid Compressed Gas Delivery System FIG. 5:

FIG. 5 illustrates a liquid compressed gas (LPG) delivery system 500. LPG delivery systems, such as LPG delivery system 500, are designed to deliver petroleum products that are gaseous at normal atmospheric temperatures but that are readily liquefiable by the application of moderate pressures. Some examples of these products include without limitation, Butane, Propane, and Anhydrous Ammonia. Those skilled in the art will appreciate that the LPG delivery system 500 could be a stand-alone system or could be mounted to a mobile unit such as a vehicle.

The LPG delivery system 500 comprises a source 501 of LPG 511, a pump 221, a Coriolis mass flowmeter 200, a back-pressure valve 220, and a destination 504 for the LPG 511. The source 501 could be any source configured to contain the LPG 511. For example, the source 501 could be a storage tank for off-loading the LPG 511 to a tank-truck, a railroad car, or a sea going vessel. In other examples, the source 501 could be the tank-truck, the railroad car, or the sea going vessel that is off-loading the LPG 511 to destination 504. Likewise, the destination 504 could be any destination configured to receive the LPG 511. For example, the destination 504 could be the tank-truck, the railroad car, the sea going vessel, or the storage tank.

The pump 221 is a conventional pump configured to receive output signals from the flowmeter 200 and in response to the output signals cause the pump 221 to turn on and shut off. In some examples of the present invention, the flowmeter 200 could also control the speed at which the pump 221 delivers the LPG 511 through the delivery system 500. The pump 221 could be centrifugal or engine driven as a matter of design choice. The pump 221 should be of an appropriate size to provide a maximum rate of flow that is within the rated capacity of the flowmeter 200. Those skilled in the art will appreciate that the pump 221 and the flowmeter 200 could include a variety of capacity ratings according to the amount of LPG 511 accommodated in the LPG delivery system 500. The back-pressure valve 220 is a conventional back-pressure valve configured to receive output signals from the flowmeter 200 and open or close in response to the output signals to prevent the back-flow of the LPG 511 in the LPG delivery system 500.

The source 501, the pump 221, the flowmeter 200, the back-pressure valve 220 and the destination 504 are connected as illustrated by FIG. 5 by conventional piping configured to accommodate the LPG 511. Specifically, the input of the pump 221 is connected to the source 501 by piping 502 and the output of the pump 221 is connected to the input of the flowmeter 200 by piping 503. The output of the flowmeter 200 is connected to the back-pressure valve 220 by piping 512. The back-pressure valve 220 is connected to the destination 504 by piping 513.

The flowmeter 200 is electrically connected to the pump 221 by the path 218 to provide the output signals that control the pump 221. The flowmeter 200 is also electrically connected to the back-pressure valve 220 by the path 219 to provide the output signals that control the back-pressure valve 220.

Advantageously, the LPG system 500 does not require a recirculation valve, air eliminator or a strainer. The LPG 511 typically does not contain entrained air vapors until the source 501 is emptied. As the source 501 is emptied and the pressure in the source 501 approaches atmospheric pressure, the LPG 511 returns to a gaseous state. When the source 501 is re-pressurized during the refilling process, the LPG 511 returns to a liquid state. Advantageously, the LPG system 500 detects the multiphase flow as the source 501 is emptied and shuts down the pump 221 and closes the back-pressure valve 220 to prevent the measurement and delivery of the multiphase flow. Once the source 501 is re-pressurized during the refilling process, the LPG system 500 can be again restarted to deliver LPG to the destination 504.

Figure 6:
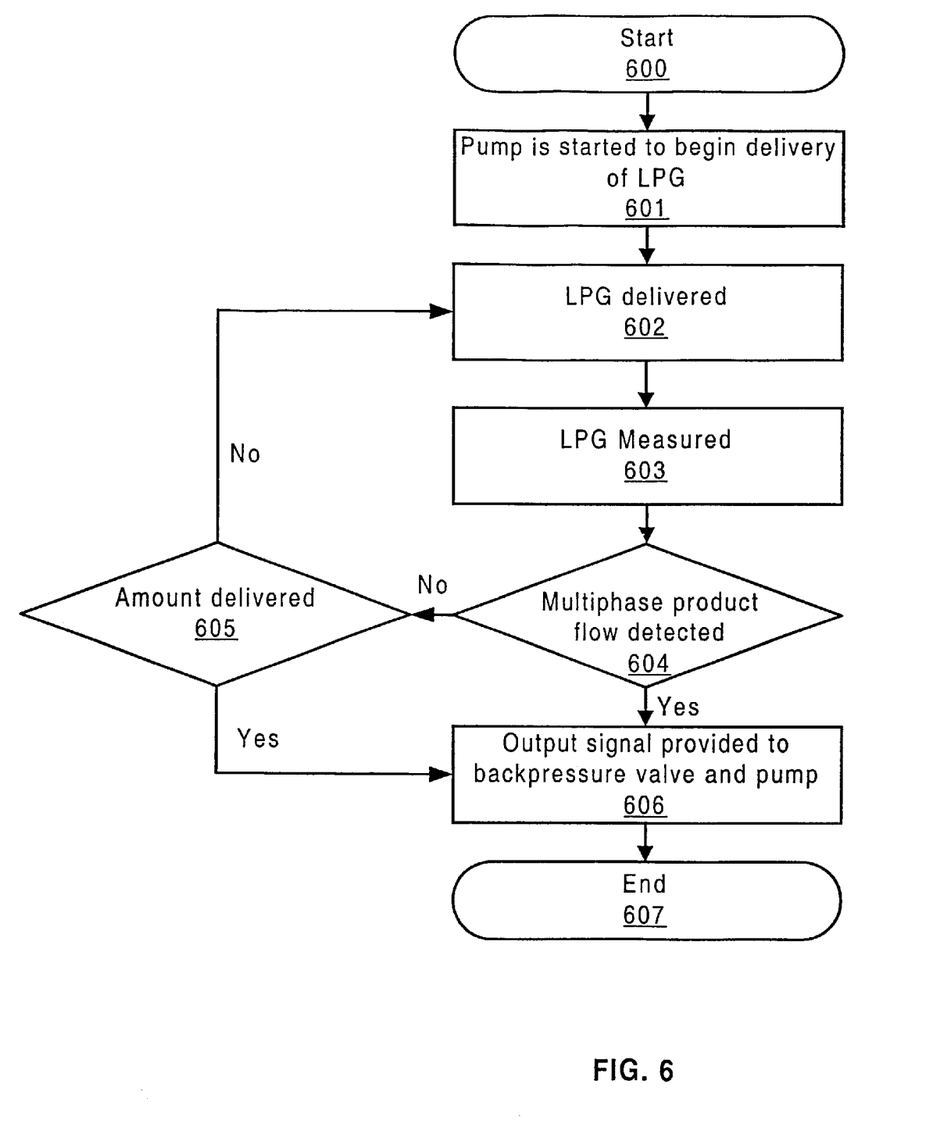
FIG. 6 depicts a flow chart illustrating an example of the operation of the embodiment of FIG. 5 according to the present invention.

Operation of the LPG Delivery System FIG. 6:

FIG. 6 is a flow chart illustrating the operation of the LPG delivery system 500 according to the present invention. On FIG. 6 the operation begins at step 600. At step 601 the pump 221 is started to begin delivery of the LPG 511 through the delivery system 500. At step 602 the LPG 511 is delivered from the source 501 to the destination 504 via the pump 221, the meter 200, and the back-pressure valve 220. At step 603 the flowmeter 200 measures the volume of LPG 511 delivered to the destination 504. At step 604 the flowmeter 200 monitors the density value of the LPG 511 to determine the flow type, e.g. a multiphase product flow or substantially pure flow of LPG 511. If at step 604 the density value of the LPG 511 exceeds the upper or lower threshold density values indicating a multiphase LPG flow, processing continues at step 606. At step 606 the flowmeter 200 provides an output signal to the pump 221. The output signal to the pump 221 causes the pump 221 to shut down and stop the delivery of the LPG 511 through the system 500. Substantially simultaneously at step 606, the flowmeter 200 provides an output signal to the back-pressure valve 220. The output signal to the back-pressure valve 220, closes the back-pressure valve 220 to prevent back-flow of LPG 511 through the system 500 and the process ends at step 607.

If at step 604 a multiphase LPG flow is not detected, processing continues at step 605. If the desired amount of LPG 511 is delivered to the destination 504 at step 605, processing continues at step 606 to shut down the pump 221 and close the back-pressure valve 220 as described above. If at step 605, the desired amount of LPG 511 is not delivered, processing continues at step 602 and the delivery of LPG 511 is continued.

Those skilled in the art will understand that the preferred embodiments described above could be subjected to apparent modifications without departing from the true scope and spirit of the invention. The inventor, accordingly, hereby states his intention to rely upon the Doctrine of Equivalents, in order to protect his full rights in the invention.

What is claimed is:

1. A fluid delivery system for measuring a substantially pure fluid product flow and preventing measurement of a multiphase fluid flow during delivery of a fluid product from a fluid source to a destination, the fluid delivery system comprising:

a pump connected between the fluid source and the destination for delivering the fluid product from the fluid source to the destination;

a Coriolis mass flowmeter connected between the pump and the destination and configured to detect a beginning of the multiphase fluid flow as the fluid product is delivered from the fluid source to the destination;

a back-pressure valve connected between the Coriolis mass flowmeter and the destination and configured to open or close under the control of the Coriolis mass flow meter;

means within the Coriolis mass flowmeter for controlling the pump in response to detecting the beginning of the multiphase fluid flow to cause the pump to stop delivery of the fluid product from the source to the destination; and means within the Coriolis mass flowmeter for controlling the back-pressure valve in response to detecting the beginning of the multiphase fluid flow to cause the back-pressure valve to close, wherein the Coriolis mass flowmeter uses the pump controlling means and the back-pressure valve controlling means to prevent the measurement of the multiphase fluid flow by stopping delivery of the fluid product in response to detecting the beginning of the multiphase fluid flow.

2. The system of claim 1 further comprising:

a recirculation valve that is connected to the Coriolis mass flowmeter, the fluid source, and the destination, and is configured to direct the fluid product in a first direction that terminates at the fluid source and a second direction that terminates at the destination.

3. The system of claim 2 further comprising:

a means within the Coriolis mass flowmeter for controlling the recirculation valve in response to detecting the beginning of the multiphase fluid flow to cause the recirculation valve to direct the fluid product in the first direction, wherein the Coriolis mass flowmeter uses the pump controlling means and the recirculation valve controlling means to prevent the measurement of the multiphase fluid flow by causing the recirculation valve to direct the fluid product in the first direction back to the fluid source.

4. The system of claim 3 wherein the back-pressure valve is configured to provide back pressure in the fluid delivery system.

5. The system of claim 4 wherein the Coriolis mass flowmeter further comprises:

meter electronics electrically connected to the recirculation valve and configured to provide a first output signal to the recirculation valve in response to detecting the beginning of the multiphase fluid flow that causes the recirculation valve to direct the fluid product in the first direction back to the fluid source.

6. The system of claim 5 wherein the meter electronics are electrically connected to the pump and configured to provide a second output signal to the pump in response to detecting the beginning of the multiphase fluid flow that causes the pump to stop delivery of the fluid product from the fluid source to the destination.

7. The system of claim 6 wherein the meter electronics are electrically connected to the back-pressure valve and configured to provide a third output signal to the back pressure valve in response to detecting the beginning of the multiphase fluid flow that causes the back pressure valve to provide the back-pressure in the fluid delivery system.

8. The system of claim 7 wherein the meter electronics are configured to measure a density value of the fluid product and if the density value is greater than an upper threshold density value, provide at least one of the first, the second, and the third output signals.

9. The system of claim 8 wherein the meter electronics are configured to measure the density value of the fluid and if the density value is lower than a lower threshold density value provide the at least one of the first, the second, and the third output signals.

10. The system of claim 9 wherein the meter electronics are configured to measure the density value of the fluid product and if the density value is equal to the upper threshold density value provide the at least one of the first, the second, and the third output signals.

11. The system of claim 9 wherein the meter electronics are configured to measure the density value of the fluid product and if the density value is equal to the lower threshold density value provide the at least one of the first, the second, and the third output signals.

12. A method for measuring a fluid product flow during delivery of a fluid product from a fluid source to a destination, the method comprising:
   delivering a fluid product from the fluid source to the destination;
   detecting a beginning of a multiphase fluid flow as the fluid product is delivered from the fluid source to the destination;
   providing a first output signal to a pump to stop delivery of the fluid product in response to detecting the beginning of the multiphase fluid flow; and
   providing a second output signal to a back-pressure valve to provide back-pressure in response to detecting the beginning of the multiphase fluid flow.

13. The method of claim 12 wherein the step of detecting the beginning of the multiphase fluid flow comprises:
   measuring a density value of the fluid product as the fluid product is delivered from the fluid source to the destination; and
   comparing the measured density value to an upper threshold density value, wherein the multiphase fluid flow is indicated by the measured density value being greater than the upper threshold density value.

14. The method of claim 13 wherein the step of detecting the beginning of the multiphase fluid flow comprises:
   measuring the density value of the fluid product as the fluid product is delivered from the fluid source to the destination; and
   comparing the measured density value to an upper threshold density value, wherein the multiphase fluid flow is indicated by the measured density value being equal to the upper threshold density value.

15. The method of claim 14 wherein the step of detecting the beginning of the multiphase fluid flow comprises:
   measuring the density value of the fluid product as the fluid product is delivered from the fluid source to the destination; and
   comparing the measured density value to a lower threshold density value, wherein the multiphase fluid flow is indicated by the measured density value being lower than the lower threshold density value.

16. The method of claim 15 wherein the step of detecting the beginning of the multiphase fluid flow comprises:
   measuring the density value of the fluid product as the fluid product is delivered from the fluid source to the destination; and
   comparing the measured density value to the lower threshold density value, wherein the multiphase fluid flow is indicated by the measured density value being equal to the lower threshold density value.

17. A fluid delivery system for measuring a substantially pure fluid product flow and preventing measurement of a multiphase fluid flow during delivery of a fluid product from a fluid source to a destination, the fluid delivery system comprising:
   a pump connected between the fluid source and the destination for delivering the fluid product from the fluid source to the destination;
   a Coriolis mass flowmeter connected between the pump and the destination and configured to detect a beginning of the multiphase fluid flow as the fluid product is delivered from the fluid source to the destination;
   a recirculation valve that is connected to the Coriolis mass flowmeter, to the fluid source, and to the destination, and is configured to direct the fluid product in a first direction that terminates at the fluid source and a second direction that terminates at the destination; and
   means within the Coriolis mass flowmeter for controlling the pump in response to detecting the beginning of the multiphase fluid flow to cause the pump to stop delivery of the fluid product from the source to the destination.

18. system of claim 17 further comprising:
   a back-pressure valve is connected between the Coriolis mass flowmeter and the destination and configured to open or close under the control of the Coriolis mass flow meter; and
   means within the Coriolis mass flowmeter for closing the back-pressure valve in response to detecting the beginning of the multiphase fluid flow; to cause the back-pressure valve to close;
   said Coriolis mass flowmeter prevents the measurement of a multiphase fluid flow by operating the pump controlling means and the back-pressure valve controlling means to stop the delivery of the fluid product in response to the detecting of the beginning of the multiphase fluid flow.

* * * * *

UNITED STATES PATENT AND TRADEMARK OFFICE
CERTIFICATE OF CORRECTION

PATENT NO. : 6,471,487 B2
DATED : October 29, 2002
INVENTOR(S) : Michael J. Keilty and Steven M. Jones It is certified that error appears in the above-identified patent and that said Letters Patent is hereby corrected as shown below:

Column 12,
Line 17, replace "back-pressure valve 220, and a destination 504 25 for the" with -- back-pressure valve 220, and a destination 504 for the --

Column 16,
Line 31, replace "18. system of claim 17 further comprising:" with -- 18. The system of claim 17 further comprising: --

Signed and Sealed this

Fourth Day of March, 2003

JAMES E. ROGAN
*Director of the United States Patent and Trademark Office*